No. 799,497. PATENTED SEPT. 12, 1905.
F. ROBINSON.
PIPE COUPLING.
APPLICATION FILED JULY 13, 1904.

Witnesses:
K. H. Butler
E. E. Potter

Inventor,
Forster Robinson
By N. C. Evert & Co.
Attorneys.

UNITED STATES PATENT OFFICE.

FORSTER ROBINSON, OF SISTERSVILLE, WEST VIRGINIA.

PIPE-COUPLING.

No. 799,497.　　　Specification of Letters Patent.　　　Patented Sept. 12, 1905.

Application filed July 13, 1904. Serial No. 216,411.

*To all whom it may concern:*

Be it known that I, FORSTER ROBINSON, a citizen of the United States of America, residing at Sistersville, in the county of Tyler and State of West Virginia, have invented certain new and useful Improvements in Pipe-Couplings, of which the following is a specification, reference being had therein to the accompanying drawings.

This invention has relation to certain new and useful improvements in pipe-couplings, and has for its object the provision of novel means for securing the ends of two sections of pipe together in such a manner that the same will be non-leakable and will readily withstand the different pressures which are exerted upon the pipes near their ends.

Briefly described, my invention consists of employing a sleeve which is adapted to fit over the confronting ends of two pipe-sections, the ends of said sleeve being flared to receive rubber gaskets, and in the flared ends of the sleeve I secure glands, novel means being employed to lock the glands in the flared ends of the sleeve. Heretofore in attachable pipe-couplings of this character the parts have been so assembled that when a high pressure was exerted upon the abutting or junction ends of the pipes the pressure had a tendency to force said pipes apart and allow a leakage to occur, which would render the coupling useless. It has also been demonstrated in couplings of this type heretofore used that the expansion and contraction of the pipes had a tendency to loosen the coupling, and no means whatever have been employed to successfully grip the pipe-sections, whereby any leakage which might occur by the expansion and contraction of the pipe-sections would be overcome and prevented.

It is therefore the primary object of this invention to provide novel means for dispensing with the unreliable features of pipe-couplings heretofore used and to employ a construction which will be comparatively inexpensive to manufacture, strong and durable, and highly efficient when used.

The many advantages derived from my improved pipe-coupling will be set forth in the following description.

Figure 1:
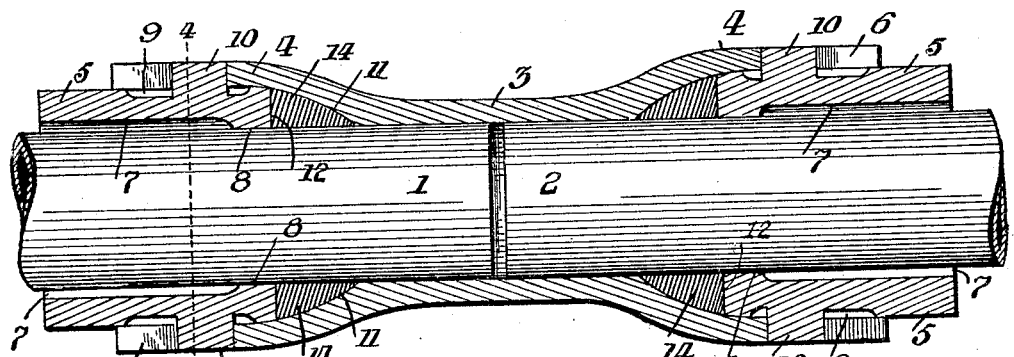
Figure 2:
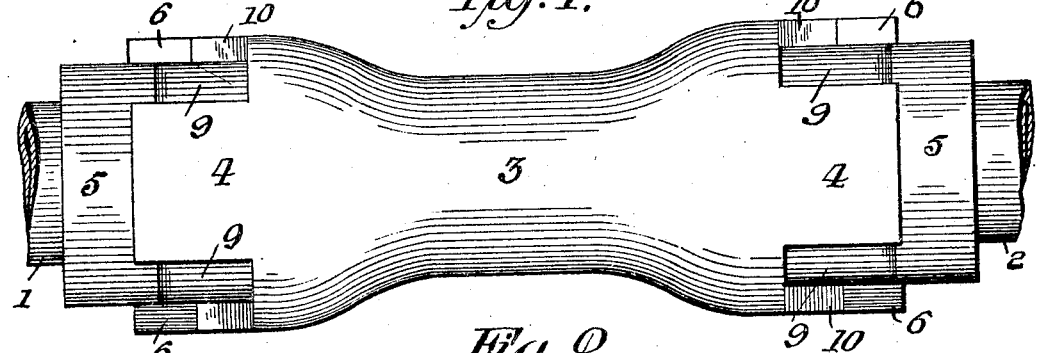
Figure 3:
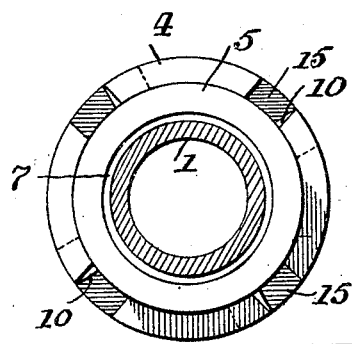
Figure 4:
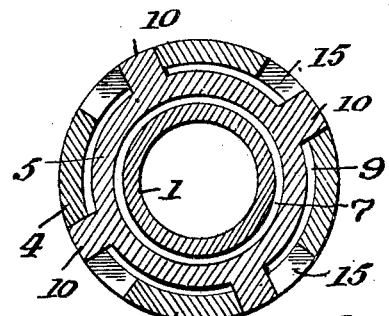
Figure 5:
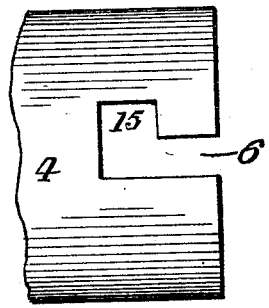

Referring to the drawings accompanying this application, Figure 1 is a longitudinal sectional view of my improved pipe-coupling. Fig. 2 is a top plan view thereof. Fig. 3 is an end view of the coupling. Fig. 4 is a transverse sectional view taken on the line 4 4 of Fig. 1, and Fig. 5 is a top plan view of a portion of one end of a sleeve employed in connection with my improved pipe-coupling.

Throughout the several views of the drawings like numerals of reference indicate like parts.

The reference-numerals 1 and 2 designate the confronting ends of two sections of pipe that are to be coupled together, and 3 designates the sleeve which is employed in coupling these sections of pipe. The central portion of the sleeve is of the same diameter as the external diameter of the two pipe-sections, and the ends of the sleeve are flared, as designated by the reference-numerals 4 4, to receive glands 5 5, which are employed to afford gripping means for the two pipe-sections. By referring to Figs. 1 and 2 of the drawings it will be observed that the ends of the sleeve are constructed alike, one end being similar to the other, and it is therefore only deemed necessary to describe one end of the sleeve comprising the pipe-coupling. The flared end 4 of the sleeve is provided with a plurality of bayonet-shaped slots 6 6, these slots being employed to lock and secure the gland 5 in engagement with the sleeve and the pipe-section upon which it is secured. The gland 5 is annular in form and has its bore drilled out, as indicated at 7, to form a collar 8, which is adapted to engage the periphery of the pipe-section upon which the gland is secured, the drilled-out bore being of a greater diameter than the external diameter of the pipe-section and forming a packing-space adapted to receive a packing of any suitable character.

The reference-numeral 9 indicates an annular groove, which is formed in the periphery of the gland 5, and formed integral with said gland are the lugs 10 10, these lugs corresponding in number to the number of the bayonet-slots formed in the flared end 4 of the sleeve, and the lugs 10 are equally spaced apart corresponding to the distance between the bayonet-slots of the sleeve.

Interposed between the tapering walls 11 of the flared end of the sleeve and the end 12 of the gland is a rubber gasket 14, which is adapted to grip the pipe-section upon which it is mounted and rigidly retain the pipe-section within the sleeve, preventing any leakage of the coupling and preventing any tendency of the pipes to pull apart under the influence of the vibration of water or gas passing through said coupling.

In assembling the several parts of the coupling the confronting ends of the pipe-sections are placed in the sleeve 3, a gland and a rubber gasket having been first placed upon each end of the pipe-sections to be coupled. The pipe-sections having been placed within the sleeve and forced inwardly until their ends confront each other, the rubber gasket mounted upon each pipe-section is forced inwardly until it engages the tapering walls 11 of the flared ends 4 4 of the sleeve 3, at which time the gland 5, mounted in each flared end of the sleeve, is moved inwardly, the lugs 10 10 passing through the bayonet-shaped slots 6 until the lugs 10 10 are in alinement with the angular portion 15 of each of the bayonet-slots, at which time the gland is rotated to carry the lugs 10 into their respective slots or seats.

By forming the slots 6 of a bayonet shape I have provided means for locking each gland in its proper position, and the glands are adapted to compress the rubber gaskets, whereby they will grip the periphery of each of the pipe-sections comprising the coupling and prevent the same from vibrating or becoming disjoined. After the glands have been once placed in their respective positions and the lugs have been rotated into engagement with the angular portion 15 of each slot the gaskets will have a tendency to force outwardly upon the glands, causing the lugs of each gland to impinge against the angular portion of each slot and prevent the gland from rotating and becoming disengaged from the sleeve.

It will be noted from the construction and general arrangement of the parts comprising my pipe-coupling that the pipe-sections may be easily and quickly detached at any time it may be desired, and while I have herein shown and described rubber gaskets as being employed to form a gripping means for the pipe-sections it will of course be understood that any suitable packing material may be used which would form a water or gas tight connection and which would serve to grip the pipe-sections and firmly hold the same together.

What I claim, and desire to secure by Letters Patent, is—

1. In a pipe-coupling, the combination of adjacent pipe-sections, a sleeve having flared ends, the flared ends having tapering inner walls, elastic gaskets arranged between the inner walls of the flared ends and the pipe-sections, glands fitting within the flared ends, said glands having integral collars at their inner ends fitting closely around the pipe-sections, and a packing-space extending from said collars to the outer ends of the glands and adapted to receive suitable packing, said glands being provided with lugs and said sleeve being provided with bayonet-slots to receive said lugs.

2. In a pipe-coupling, a sleeve having a central bore, of a diameter equal to the diameter of the pipe to be coupled, flared ends, elastic gaskets fitting in the flared ends, glands fitting in the flared ends and having integral collars at their inner ends, the bore of said collars being equal in diameter to the bore of the sleeve, said glands having a packing-space extending from said collars to their outer ends and the said sleeve and said glands being provided with interlocking means to retain the glands in the sleeve.

In testimony whereof I affix my signature in the presence of two witnesses.

FORSTER ROBINSON.

Witnesses:
  A. R. FORSTER,
  NELL G. BLACK.